(12) United States Patent
Sasaki

(10) Patent No.: US 10,369,766 B2
(45) Date of Patent: Aug. 6, 2019

(54) COMPOSITE MOLDED ARTICLE, LAMINATE, AND METHOD FOR PRODUCING COMPOSITE MOLDED ARTICLE

(71) Applicant: JSP Corporation, Tokyo (JP)

(72) Inventor: Hidehiro Sasaki, Tochigi (JP)

(73) Assignee: JSP Corporation, Tokyo (JP)

( * ) Notice: Subject to any disclaimer, the term of this patent is extended or adjusted under 35 U.S.C. 154(b) by 31 days.

(21) Appl. No.: 15/318,608

(22) PCT Filed: Jul. 15, 2015

(86) PCT No.: PCT/JP2015/070313
§ 371 (c)(1),
(2) Date: Dec. 13, 2016

(87) PCT Pub. No.: WO2016/010089
PCT Pub. Date: Jan. 21, 2016

(65) Prior Publication Data
US 2018/0162093 A1      Jun. 14, 2018

(30) Foreign Application Priority Data

Jul. 15, 2014 (JP) .................................. 2014-145233
Sep. 26, 2014 (WO) .................. PCT/JP2014/075741

(51) Int. Cl.
*B32B 5/18* (2006.01)
*B32B 7/12* (2006.01)
(Continued)

(52) U.S. Cl.
CPC .................. *B32B 5/18* (2013.01); *B32B 5/16* (2013.01); *B32B 7/12* (2013.01); *B32B 9/002* (2013.01);
(Continued)

(58) Field of Classification Search
CPC ................................................ B32B 5/00–5/32
See application file for complete search history.

(56) References Cited

U.S. PATENT DOCUMENTS

| | | | | |
|---|---|---|---|---|
| 3,030,256 A | * | 4/1962 | Rosenthal | E04C 2/205 156/148 |
| 4,362,778 A | * | 12/1982 | Andersson | B32B 5/18 442/221 |
| 2014/0336289 A1 | * | 11/2014 | Shinohara | C08J 9/12 521/60 |

FOREIGN PATENT DOCUMENTS

| | | |
|---|---|---|
| JP | H10-219021 A | 8/1998 |
| JP | 2000-158547 A | 6/2000 |

(Continued)

OTHER PUBLICATIONS

Machine translation JP2000-319440 (Year: 2000).*
International Search Report dated Oct. 20, 2015 for PCT/JP2015/070313 and English translation of the same (5 pages).

*Primary Examiner* — Alexandre F Ferre
(74) *Attorney, Agent, or Firm* — Fitch, Even, Tabin & Flannery LLP

(57) ABSTRACT

The present invention provides a composite molded article in which aliphatic polyester-based resin expanded beads and a thermosetting resin cured product containing a reinforcing fiber, which is formed between the expanded beads, are integrally fixed, wherein the aliphatic polyester-based resin is a polylactic acid-based resin, and a flexural modulus E (MPa) of the composite molded article and a density ρ (kg/m³) of the composite molded article satisfy Expression (1): $E^{1/3}/\rho \geq 0.02$ $[(MPa)^{1/3}(kg/m^3)^{-1}]$, and a composite molded article and a laminate having more improved strength.

17 Claims, 1 Drawing Sheet

(51) Int. Cl.

| | |
|---|---|
| B32B 27/06 | (2006.01) |
| C08J 9/00 | (2006.01) |
| C08J 9/236 | (2006.01) |
| C08J 9/35 | (2006.01) |
| B32B 9/04 | (2006.01) |
| B32B 5/16 | (2006.01) |
| B32B 9/00 | (2006.01) |
| B32B 15/04 | (2006.01) |
| B32B 15/16 | (2006.01) |
| B32B 15/18 | (2006.01) |
| B32B 15/20 | (2006.01) |
| B32B 17/00 | (2006.01) |
| B32B 21/04 | (2006.01) |
| B32B 21/12 | (2006.01) |
| B32B 27/14 | (2006.01) |
| B32B 27/36 | (2006.01) |

(52) U.S. Cl.
CPC .............. *B32B 9/046* (2013.01); *B32B 9/048* (2013.01); *B32B 15/046* (2013.01); *B32B 15/16* (2013.01); *B32B 15/18* (2013.01); *B32B 15/20* (2013.01); *B32B 17/00* (2013.01); *B32B 21/047* (2013.01); *B32B 21/12* (2013.01); *B32B 27/06* (2013.01); *B32B 27/065* (2013.01); *B32B 27/14* (2013.01); *B32B 27/36* (2013.01); *C08J 9/0061* (2013.01); *C08J 9/0085* (2013.01); *C08J 9/236* (2013.01); *C08J 9/35* (2013.01); *B32B 2250/02* (2013.01); *B32B 2260/025* (2013.01); *B32B 2260/046* (2013.01); *B32B 2262/0223* (2013.01); *B32B 2262/0276* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2264/0278* (2013.01); *B32B 2264/10* (2013.01); *B32B 2264/101* (2013.01); *B32B 2264/102* (2013.01); *B32B 2264/104* (2013.01); *B32B 2264/12* (2013.01); *B32B 2266/0264* (2013.01); *B32B 2307/102* (2013.01); *B32B 2307/304* (2013.01); *B32B 2307/546* (2013.01); *B32B 2307/72* (2013.01); *B32B 2307/732* (2013.01); *B32B 2419/00* (2013.01); *B32B 2457/12* (2013.01); *B32B 2479/00* (2013.01); *B32B 2597/00* (2013.01); *B32B 2605/003* (2013.01); *B32B 2605/08* (2013.01); *B32B 2605/10* (2013.01); *B32B 2605/12* (2013.01); *C08J 2300/12* (2013.01); *C08J 2367/04* (2013.01); *C08J 2463/00* (2013.01); *C08J 2467/06* (2013.01)

(56) References Cited

FOREIGN PATENT DOCUMENTS

| | | | |
|---|---|---|---|
| JP | 2000-319440 A | 11/2000 | |
| JP | 2003-181966 A | 7/2003 | |
| JP | 2010-150709 A | 7/2010 | |
| JP | 2012-40787 A | 3/2012 | |
| JP | 2013-203888 A | 10/2013 | |
| JP | 2014-193539 A | 10/2014 | |
| WO | WO-2013058056 A1 * | 4/2013 | ............... C08J 9/12 |

* cited by examiner

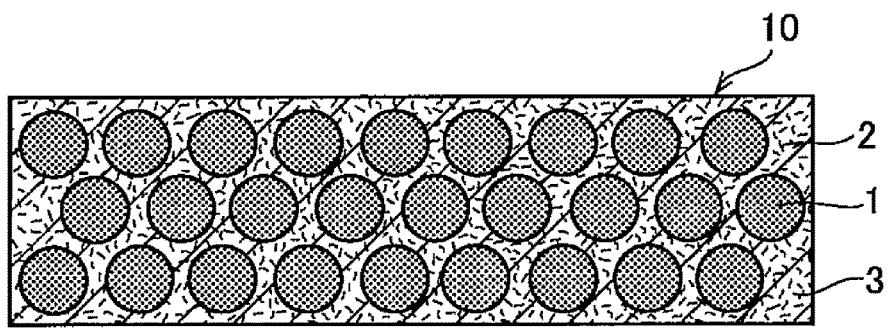

COMPOSITE MOLDED ARTICLE, LAMINATE, AND METHOD FOR PRODUCING COMPOSITE MOLDED ARTICLE

CROSS-REFERENCE TO RELATED APPLICATIONS

This application is a U.S. national phase application filed under 35 U.S.C. § 371 of International Application PCT/JP2015/070313, filed on Jul. 15, 2015, designating the United States, which claims priority from Japanese Application No. 2014-145233 and International Application No. PCT/JP2014/075741 filed Jul. 15, 2014 and Sep. 26, 2014, respectively, which are hereby incorporated herein by reference in their entirety.

FIELD OF THE INVENTION

The present invention relates to a composite molded article including expanded beads and a thermosetting resin, a laminate formed by laminating the composite molded article and a surface material, and furthermore, a method for producing a composite molded article including expanded beads and a thermosetting resin.

BACKGROUND OF THE INVENTION

Conventionally, in constituent materials of various structures such as buildings or transportation media, there has been a demand for a material which is lightweight and excellent in strength.

As one of the constituent materials, PTL 1 discloses a molded article obtained by bonding synthetic resin expanded granules integrally through a thermosetting resin. The molded article contains a curing agent, but is substantially uncured, and is a molded article obtained by preparing an uncured synthetic resin expanded granule aggregate that is solid or semi-solid at ambient temperature and curing the uncured synthetic resin expanded granule aggregate. However, there is a demand for a composite molded article having higher strength.

CITATION LIST

Patent Literature

PTL 1: JP-A-10-219021

DISCLOSURE OF THE INVENTION

It is an object of the present invention to provide a composite molded article of expanded beads and a thermosetting resin, and a laminate obtained by combining the composite molded article and a surface material (surface layer), which have more improved strength, and a method for producing a composite molded article including expanded beads and a thermosetting resin.

As a result of intensive study to achieve the objects, the present inventors have found that it is most effective to form a composite molded article in which, particularly, aliphatic polyester-based resin expanded beads and a thermosetting resin cured product containing a reinforcing fiber and being present between the expanded beads are fixed integrally, thereby achieving the present invention.

That is, the present invention provides [1] to [11] as described below.

[1] A composite molded article in which aliphatic polyester-based resin expanded beads and a thermosetting resin cured product containing a reinforcing fiber, which is formed between the expanded beads, are integrally fixed,
wherein the aliphatic polyester-based resin is a polylactic acid-based resin, and
a flexural modulus E (MPa) of the composite molded article and a density $\rho$(kg/m$^3$) of the composite molded article satisfy the following Expression (1):

$$E^{1/3}/\rho \geq 0.020\ [(\text{MPa})^{1/3}(\text{kg/m}^3)^{-1}] \qquad (1).$$

[2] The composite molded article described in [1], wherein a content of the reinforcing fiber in the thermosetting resin cured product is 3% by weight to 50% by weight.

[3] The composite molded article described in [1] or [2], in which the reinforcing fiber is one or more selected from the group consisting of a glass fiber, a carbon fiber, and a vinylon fiber, and a fiber length L of the reinforcing fiber is 0.05 mm to 20 mm, and a value of L/D, which is a ratio of the fiber length L and an average diameter D of a fiber cross-section, is 2 or more.

[4] The composite molded article described in any one of [1] to [3], in which the thermosetting resin is one or more selected from the group consisting of an unsaturated polyester-based resin and an epoxy-based resin.

[5] The composite molded article described in any one of [1] to [4], in which the density of the composite molded article is 120 g/L to 700 g/L.

[6] A laminate in which the composite molded article described in any one of [1] to [5] and a surface material are laminated.

[7] The laminate described in [6], in which the surface material is one or more selected from the group consisting of glass, metal, wood, and stone.

[8] The laminate described in [6] or [7], in which a density of the laminate is less than 1 kg/L.

[9] A method for producing a composite molded article including:
mixing aliphatic polyester-based resin expanded beads and a thermosetting resin composition containing a reinforcing fiber to obtain a mixture; and
heating and curing the mixture to integrally fix expanded beads and a thermosetting resin cured product,
wherein the aliphatic polyester-based resin is a polylactic acid-based resin, and
a difference between an endothermic calorific value (Bf:endo) [J/g] of the expanded beads and an exothermic calorific value (Bf:exo) [J/g] of the expanded beads as measured based on Condition 1 described below satisfies the following Expression (2):

$$(Bf\!:\!endo)-(Bf\!:\!exo)>20 \qquad (2)$$

Condition 1: the endothermic calorific value (Bf:endo) and the exothermic calorific value (Bf:exo) are values which are measured based on a DSC curve (hereinafter, sometimes referred to as a first DSC curve) obtained when heating and melting 1 to 4 mg of expanded beads from 23° C. to a temperature that is 30° C. higher than that at the end of a fusion peak, at a heating rate of 10° C./min according to heat flux differential scanning calorimetry as described in JIS K7122 (1987).

[10] The method for producing a composite molded article described in [9], in which the expanded beads used for obtaining the mixture are expanded beads having a bulk density of 15 to 250 g/L.

[11] The method for producing a composite molded article described in [9] or [10], in which the mixture is an uncured expanded beads aggregate which is solid or semi-solid at ambient temperature, the uncured expanded beads aggregate is placed and shaped in a mold, and the uncured expanded beads aggregate is heated and cured in the mold.

BRIEF DESCRIPTION OF THE DRAWINGS

FIG. 1 is an explanatory view schematically illustrating a cross-section of a composite molded article of the present invention.

REFERENCE SIGNS LIST

1: Expanded beads
2: Reinforcing fiber
3: Thermosetting resin cured product
10: Composite molded article

DESCRIPTION OF EMBODIMENTS

The composite molded article of the present invention is a composite molded article 10 including a plurality of expanded beads 1, a reinforcing fiber 2, and a thermosetting resin cured product 3 as illustrated in FIG. 1. The thermosetting resin cured product 3 containing the reinforcing fiber 2 is present between the expanded beads 1, and the plurality of expanded beads 1 and the thermosetting resin cured product 3 are integrally fixed. For example, the thermosetting resin cured product is formed in a continuous phase in which a thermosetting resin composition (hereinafter, sometimes referred to as a thermosetting resin liquid raw material) is cured in a continuous phase state between the expanded beads. And, since the thermosetting resin cured product forms a so-called three-dimensional network structure, the composite molded article has high strength.

<Aliphatic Polyester-Based Resin Expanded Beads>

The expanded beads constituting the composite molded article are formed of an aliphatic polyester-based resin. The aliphatic polyester-based resin contains aliphatic ester as a main component in the main chain. The content of the aliphatic ester is at least 60 mol %, preferably 80 to 100 mol %, and more preferably 90 to 100 mol % in the main chain. The aliphatic polyester-based resin includes a hydroxyl acid polycondensate, a ring-opened polymer of lactone, a polycondensate of a polyhydric alcohol component and a polybasic carboxylic acid component, and the like. Examples of the hydroxyl acid polycondensate include polylactic acid, a polycondensate of hydroxybutyric acid, and the like. Examples of the ring-opened polymer of lactone include polycaprolactone, polypropiolactone, and the like. Examples of the polycondensate of a polyhydric alcohol component and a polybasic carboxylic acid component include polybutylene succinate, polybutylene adipate, polyethylene succinate, and the like. Among those, polylactic acid-based resin is used from the viewpoint of obtaining a high-strength composite molded article.

Furthermore, the polylactic acid-based resin is composed of polylactic acid, or a mixture of polylactic acid and other resins. Note that the polylactic acid is preferably a polymer containing 50 mol % or more of a lactic acid-derived component unit. Examples of the polylactic acid include (a) a polymer of lactic acid, (b) a copolymer of lactic acid and other aliphatic polybasic carboxylic acid, (c) a copolymer of lactic acid, aliphatic polyhydric alcohol, and aliphatic polybasic carboxylic acid, (d) a copolymer of lactic acid and aliphatic polybasic carboxylic acid, (e) a copolymer of lactic acid and aliphatic polyhydric alcohol, (f) a mixture in any combination of (a) to (e), and the like. Note that the polylactic acid also includes so-called stereo complex polylactic acid and stereo block polylactic acid. Specific examples of lactic acid include L-lactic acid, D-lactic acid, DL-lactic acid, or L-lactide, D-lactide, or DL-lactide, which is a cyclic dimer thereof, or a mixture thereof.

Other examples of the aliphatic hydroxycarboxylic acid in the above (b) include glycolic acid, hydroxybutyric acid, hydroxyvaleric acid, hydroxycaproic acid, hydroxyheptanoic acid, and the like. Further, examples of the aliphatic polyhydric alcohol in the above (c) and (e) include ethylene glycol, 1,4-butanediol, 1,6-hexanediol, 1,4-cyclohexanedimethanol, neopentyl glycol, decamethylene glycol, glycerin, trimethylolpropane, pentaerythritol, and the like. Further, examples of the aliphatic polybasic carboxylic acid in the above (c) and (d) include succinic acid, adipic acid, suberic acid, sebacic acid, dodecanedicarboxylic acid, succinic anhydride, adipic anhydride, trimesic acid, propanetricarboxylic acid, pyromellitic acid, pyromellitic acid anhydride, and the like.

Note that the polylactic acid-based resin is preferably one in which an endothermic calorific value (Br: endo) of a polylactic acid-based resin (raw material) is 25 J/g or more as determined by heat flux differential scanning calorimetry based on Condition a below. The fact that the (Br: endo) is within the range means that, when crystallization of the polylactic acid constituting the expanded beads is sufficiently promoted, the amount of crystal components of the expanded beads by the polylactic acid becomes large. That is, it means that expanded beads with increased crystallinity may be obtained by increasing the crystallinity of the polylactic acid. From this viewpoint, the (Br: endo) is 30 J/g or more, and preferably 35J/g or more. Further, the upper limit of the (Br: endo) is about 70 J/g, and further, 60 J/g.

In the present specification, the endothermic calorific value (Br: endo) [J/g] of the resin constituting the expanded beads may be calculated based on an endothermic calorific value of the expanded beads determined based on Condition a below according to the heat flux differential scanning calorimetry as described in JIS K7122 (1987).

Condition a

[Measurement of Endothermic Calorific Value]

A measured value of the endothermic calorific value (Br:endo) is a value which is determined based on a DSC curve (hereinafter, also referred to as a second DSC curve) obtained when heating and melting 1 to 4 mg of measurement sample taken from polylactic acid-based resin expanded beads to a temperature that is 30° C. higher than a temperature at the end of a fusion peak, maintaining the sample at that temperature for 10 minutes, cooling the sample to 110° C. at a cooling rate of 10° C./min, maintaining the sample at that temperature for 120 minutes, subjecting the sample to a heat treatment of cooling it to 40° C. at a cooling rate of 10° C./min, and then, heating and melting the sample again to a temperature that is 30° C. higher than a temperature at the end of a fusion peak at a heating rate of 10° C./min, according to the heat flux differential scanning calorimetry as described in JIS K7122 (1987). Further, in the above-described measurement, at least five samples taken from the expanded beads group are measured and averaged.

Further, examples of the above-described expanded beads include, in addition to the expanded beads obtained from the resin beads, expanded strands, pulverized matters of molded foams and extruded foams, and the like. Further, as the expanded beads, cylindrical expanded beads having a void formed of a through-hole in a expanded beads, which is described in JP-A-08-108441, may be used. Note that, when the cylindrical expanded beads are used, the thermosetting resin cured product is formed between the expanded beads, as well as in the through-hole portion of the expanded beads.

Note that the available shape of the resin beads may be columnar, spherical, prismatic, elliptical spherical, cylindrical, or the like. The expanded beads obtained by expanding the resin beads have a shape substantially corresponding to the shape of the resin beads before expanding, and become expanded beads corresponding to the columnar, spherical, prismatic, elliptical spherical, or cylindrical shape.

In the expanded beads, since the shape determines a network structure by the thermosetting resin cured product (hereinafter, sometimes referred to as a "network structure of the thermosetting resin cured product"), the dimension ratio of the expanded beads in a longitudinal direction and a lateral direction (so-called "aspect ratio") is preferably 0.5 to 2. Within the range, a space is easily and uniformly formed between the expanded beads so that a more uniform and strong network structure of the thermosetting resin cured product is formed in composite article.

Further, the bead diameter of the expanded beads is preferably 1 to 5 mm, and more preferably 2 to 4 mm. Within the range, the particle diameter of the expanded beads is suitable for the improvement in strength of the composite molded article. Note that the particle diameter of the expanded beads is an average value of values measured as the maximum external dimensions of at least 100 expanded beads. By using the expanded beads as described above, the network diameter in the network structure of the thermosetting resin cured product becomes 1 to 5 mm. A more preferred network diameter is 2 to 4 mm.

Moreover, the expanded beads used in the present invention may be not only expanded beads of single layer formed of only an expanded layer but also expanded beads of a multilayer structure. Note that the expanded beads of a multilayer structure may be exemplified by, in particular, expanded beads formed of an expanded core layer and a coating layer that coats the core layer. Further, the coating layer may be foamed or non-foamed.

As the expanded beads of a multilayer structure, for example, a polylactic acid resin having a crystal structure in its core layer, or a polylactic acid resin that is not crystallized or substantially not crystallized in the coating layer (hereinafter, collectively referred to as a low-crystalline polylactic acid-based resin) may be preferably used. Since the low-crystalline polylactic acid-based resin is liable to be dissolved or swelled in a thermosetting resin, when the polylactic acid-based resin of the coating layer is low-crystalline, its affinity for the thermosetting resin liquid raw material becomes higher.

Meanwhile, since the polylactic acid-based resin having the crystal structure is hardly dissolved or swelled in the thermosetting resin liquid raw material, when the polylactic acid resin of the core layer has the crystal structure, the shape of the expanded beads is easily maintained.

The polylactic acid-based resin expanded beads as described above may be prepared by a method described in, for example, JP-A-2012-025869.

The bulk density of the expanded beads used in the composite molded article of the present invention is preferably 15 g/L to 250 g/L, more preferably 30 to 200 g/L, and still more preferably 60 to 150 g/L. Within the range, a weight lightening effect is increased, and a network structure of the thermosetting resin cured product with more excellent strength is easily formed.

Examples of the expanded beads include expanded beads having a bulk density of 15 to 200 g/L, among "LACTIF (registered trademark)" manufactured by JSP Corporation, which is a polylactic acid-based resin expanded beads. Further, expanded beads may be obtained with reference to JP-B-53-1313, WO2012/086305, JP-A-2012-025869, and the like.

Weight per expanded beads is preferably 0.1 mg to 5 mg. If the weight is 0.1 mg or more, it is possible to secure an expansion ratio, and if the weight is 5 mg or less, it is possible to cope with a thin-wall molding.

<Reinforcing Fiber>

The composite molded article of the present invention contains a reinforcing fiber. The reinforcing fiber is blended in the thermosetting resin cured product in order to obtain a high strength, and examples thereof include a glass fiber, a carbon fiber, a vinylon fiber, a polyester fiber, a ceramics fiber, a steel fiber, a stainless steel (SUS) fiber, an aluminum fiber, a boron fiber, and a combination of two or more thereof. Among those, a glass fiber, a carbon fiber, or a vinylon fiber is preferred from the viewpoint of a high strength, versatility, economic efficiency, and the like.

The composite molded article of the present invention needs to contain a reinforcing fiber in the thermosetting resin cured product. The blended amount is preferably in a range of 3% by weight to 50% by weight, more preferably 5% by weight to 40% by weight, and particularly preferably 10% by weight to 35% by weight, when the weight of the thermosetting resin cured product (including the reinforcing fiber) is set to 100% by weight.

An average length L of the reinforcing fiber is preferably 0.05 mm to 20 mm. The average length L of 0.05 mm or more is preferred because the impact resistance is enhanced due to entanglement of the fiber. Further, the average length L of 20 mm or less is preferred because the fiber is uniformly dispersed.

Further, the reinforcing fiber preferably has a value of L/D, which is a ratio of the fiber length L and a fiber diameter D, of 2 or more, more preferably 5 or more, and particularly preferably 7 or more, and the upper limit thereof is preferably 20 or less. Within the range, an effect of enhancing the mechanical property is increased, so that a composite molded article, particularly, which is excellent in impact resistance may be formed.

Note that the fiber length L and the fiber diameter D of the reinforcing fiber may be measured by observation with an electron microscope. Note that the fiber length L and the fiber diameter D are calculated by setting a parameter as an average value to 100 or more.

In the present invention, the thermosetting resin cured product may further contain a powdered reinforcing material, in addition to the reinforcing fiber.

Examples of the reinforcing material include a glass powder, and those commonly called inorganic fillers such as silica, alumina, titanium oxide, iron oxide, zinc oxide, magnesium oxide, antimony oxide, barium ferrite, strontium ferrite, beryllium oxide, pumice, talc, kaolin, mica, sericite, borax, aluminum hydroxide, magnesium hydroxide, aluminum carbonate, calcium carbonate, barium sulfate, ammonium sulfate, calcium sulfite, and a combination of two or more thereof.

The reinforcing material is blended in an amount of 5 to 150 parts by weight, and preferably 10 to 100 parts by weight based on 100 parts by weight of the thermosetting resin raw material. It is preferred to sufficiently disperse the reinforcing material in the thermosetting resin liquid raw material prior to curing.

<Thermosetting Resin>

Examples of the thermosetting resin constituting the composite molded article of the present invention include an unsaturated polyester-based resin, an epoxy-based resin, a vinyl ester-based resin, a phenolic-based resin, a polyamide-based resin, an urea-based resin, a melamine-based resin, a polyimide-based resin, a diallyl phthalate-based resin, an urethane-based resin, and the like. Among those, preferred is a combination of one or two of an unsaturated polyester-based resin and an epoxy-based resin, and more preferred is an unsaturated polyester-based resin, from the viewpoint of excellent adhesion with the aliphatic polyester-based resin constituting the expanded beads of the present invention.

When manufacturing the composite molded article, a curing agent capable of reacting with the thermosetting resin raw material to form a cured product is used. The curing agent is not particularly limited as long as it can be solidified by reaction with the thermosetting resin raw material to thereby form a cured product. Examples of the curing agent for the epoxy resin include an acid anhydride such as methylhexahydrophthalic anhydride, a novolac type phenolic resin, a phenol resin such as a cresol novolak type epoxy resin, a phthalic anhydride derivative, dicyandiamide, an imidazole compound, an aluminum chelate, an amine complex of Lewis acid such as $BF_3$, and the like. These may be used either alone or in combination of two or more thereof.

Note that, as the unsaturated polyester-based resin raw material, a known unsaturated polyester resin raw material, which is obtained by dissolving a condensation product obtained from unsaturated polybasic carboxylic acid and polyhydric alcohol in a vinyl monomer, may be most preferably used. Examples of the unsaturated polybasic carboxylic acid include maleic anhydride, fumaric acid, adipic acid, phthalic anhydride, isophthalic acid, and the like. Examples of the polyhydric alcohol include ethylene glycol, 1,3-butylene glycol, diethylene glycol, propylene glycol, and the like. Examples of the vinyl monomer include a styrene-based monomer and the like.

Further, when the unsaturated polyester-based resin is used, peroxide may be used in the curing agent (polymerization initiator). As the peroxide, organic peroxide such benzoyl peroxide, lauroyl peroxide, methyl ethyl ketone peroxide, peroxy perbenzoate, peroxy ketal, or dicumyl peroxide, is used alone or as a mixture of two or more thereof. A chain transfer agent may also be used. The addition ratio of the curing agent is preferably 0.1 to 10 parts by weight, and particularly 0.3 to 5.0 parts by weight based on 100 parts by weight of the unsaturated polyester resin raw material.

Further, examples of the epoxy resin used in the thermosetting resin of the present invention include a bisphenol epoxy resin such as a bisphenol A type epoxy resin, a bisphenol F type epoxy resin, and a bisphenol S-type epoxy resin; a novolac type epoxy resin such as a phenol novolac type epoxy resin and a cresol novolac type epoxy resin; an alicyclic epoxy resin; a glycidyl ether type epoxy resin; a glycidylated amine type epoxy resin; a halogenated epoxy resin; or an addition polymer of an epoxy group-containing monomer or oligomer such as glycidylated polyester, glycidylated polyurethane, or glycidylated acrylic.

These epoxy-based resins may be used either alone or in combination of two or more thereof.

Further, a vinyl ester-based resin may also be used in the thermosetting resin of the present invention. The vinyl ester-based resin is sometimes referred to as an epoxy acrylate resin, and examples thereof include an addition polymer type resin obtained by esterifying various epoxy compounds as raw materials using acrylic acid or methacrylic acid and adding a polymerizable monomer. As the epoxy compound in the raw material, any conventional novolac type epoxy compound and bisphenol A type epoxy compound are used, but a vinyl ester resin prepared as a bisphenol A type epoxy resin is suitably used for the purpose of the present invention.

Further, the thermosetting resin may contain a modifier such as a filler, a colorant, an ultraviolet absorber, an antioxidant, a flame retardant, an antifungal agent, a plasticizer, a coupling agent, an electrically conductive filler, a magnetic filler, a thermally conductive filler, an antistatic agent, and elastic fine particles as necessary within a range that does not inhibit the purpose of the present invention. Particularly, a flame retardant is preferably contained in order to obtain flame retardancy.

(Composite Molded Article)

In the present invention, it is important to use the aliphatic polyester-based resin as a resin constituting the expanded beads. The aliphatic polyester-based resin is excellent in affinity for the thermosetting resin raw material. As for the mechanism, it is thought that, because the SP values of the thermosetting resin and the aliphatic polyester resin constituting the expanded beads are similar to each other, the adhesion is improved. Accordingly, it is thought that the bonding between the expanded beads and the thermosetting resin cured product becomes stronger as compared with a case where the polyolefin-based resin expanded beads in the related art are used, so that the strength of the composite molded article is enhanced.

Further, since an alkyd component may be present at the interface of the expanded beads, the aliphatic polyester-based resin expanded beads are hard to form steric hindrance at the interface of the expanded beads. Meanwhile, in aromatic polyester resin expanded beads or expanded beads of a resin obtained by grafting a styrene component to a polyolefin-based resin, the aromatic component in the aromatic polyester resin or the aromatic component of the resin obtained by grafting the styrene component to the polyolefin-based resin is sterically hindered at the interface of the expanded beads. Thus, when using the aliphatic polyester-based resin expanded beads, it is thought that the distance between the expanded beads and the reinforcing fiber in the thermosetting resin is reduced, and the dispersion state of the reinforcing fiber present between the expanded beads becomes uniform, so that the adhesion of the expanded beads and the thermosetting resin is enhanced. Furthermore, from the viewpoint of further enhancing the specific strength (weight-specific strength) of the composite molded article by suppressing volume reduction of the expanded beads due to heat generated when the thermosetting resin composition is cured, the resin constituting the expanded beads is preferably a polylactic acid-based resin among the aliphatic polyester-based resins.

The density of the composite molded article is preferably 120 to 700 g/L, and more preferably 150 to 400 g/L. Within the range, the molded article is excellent in lightweight property as well as strength. Note that the density of the composite molded article is a value obtained by dividing the weight of the composite molded article by the volume of the composite molded article determined by a submersion method and the like.

The flexural modulus E (MPa) of the composite molded article and the density ρ ($kg/m^3$) of the composite molded article are required to satisfy the following Expression (1).

$$E^{1/3}/\rho \geq 0.020 \ [(MPa)^{1/3}(kg/m^3)^{-1}] \tag{1}$$

Note that the value determined by Expression (1) is also referred to as a specific flexural rigidity of the composite molded article. When the bond between the thermosetting resin cured product and the reinforcing fiber or between the thermosetting resin cured product and the expanded beads is week, it is thought that the specific flexural rigidity is reduced. From the above viewpoint, the specific flexural rigidity is preferably 0.022 or more, and more preferably 0.025 or more. Note that the upper limit of the specific flexural rigidity is about 0.2.

Further, an average cell diameter of the composite molded article, that is, a cell diameter corresponding to a mesh of the network structure constituted by the thermosetting resin cured product is preferably 1 to 5 mm. Within the range, a local strength reduction is not caused, and a composite molded article of uniform strength is obtained. In a method of measuring the average cell diameter, the composite molded article is cut into two parts to take an enlarged photograph of the cut surface. Subsequently, a straight line is drawn on the photograph from the surface of the composite molded article up to the opposite surface through the vicinity of the center, and the number of cells that intersect with the straight line (the number of the expanded beads constituting the composite molded article) is counted. Then, the length of the straight line (actual length) is divided by the number of cells to determine a cell diameter per cell, and this operation is performed at five sites of the composite molded article in the same manner, so that an average value of the obtained measurement values is used as an average cell diameter (mm) of the composite molded article. Note that the cell diameter may be controlled by changing the diameter of the expanded beads.

The composite molded article of the present invention may be formed, for example, by mixing a number of expanded beads formed of an aliphatic polyester resin and a thermosetting resin composition containing a reinforcing fiber to obtain a mixture, and heating and curing the mixture to integrally fix the expanded beads and the thermosetting resin cured product.

Note that, since the thermosetting resin composition generates heat upon curing, the expanded beads of an uncured expanded beads aggregate may be reduced in volume. Therefore, it is preferable to prepare precautionary measures in the event of the volume reduction of the expanded beads as described in the following (i) and (ii).

(i) As a component constituting the expanded beads, a crystal component of a heat-generation temperature or higher is contained in advance. For example, since a measure of the maximum heat-generation temperature is 130° C. in the case of the unsaturated polyester-based thermosetting resin, and a measure of the maximum heat-generation temperature is 150° C. in the case of the epoxy-based resin, a polylactic acid-based resin having a melting point of 150° C. or higher is preferably used as a base resin of the expanded beads, and thus, the volume reduction may be prevented or suppressed. From the above-described viewpoint, the melting point of the polylactic acid-based resin is more preferably 155 to 170° C. Note that, in the expanded beads of a multilayer structure, the melting point of the resin forming the core layer is preferably within the above range.

Note that the melting point of the polylactic acid-based resin is measured according to JIS K7121-1987. The melting point is a temperature of the peak top, which is obtained from the second DSC curve obtained by differential scanning calorimetry. As for the second DSC curve obtained by differential scanning calorimetry of the resin, 1 to 5 mg of the polylactic acid-based resin is heated to 200° C. at a heating rate of 10° C./min (here, the obtained DSC curve is referred to as the first DSC curve), and subsequently, cooled from 200° C. to 0° C. at a cooling rate of 10° C./min. Thereafter, the DSC curve obtained by increasing the temperature to 200° C. at a heating rate of 10° C/min again is regarded as the second DSC curve. Further, when two or more peak top temperatures appear in the resin, the peak apex temperature of the highest temperature side is regarded as a melting point. Further, in the above measurement, at least five samples taken from the expanded beads group are measured and averaged.

Moreover, since the polylactic acid constituting the polylactic acid-based resin expanded beads has crystallinity, it is possible to prevent or suppress the polylactic acid-based expanded beads from being reduced in volume, causing a gap at the interface with the thermosetting resin due to heat shrinkage of the expanded beads, or generating a sink mark in the composite molded article, when producing the composite molded article.

Accordingly, in the polylactic acid-based resin expanded beads used in the present invention, it is preferred that a difference between an endothermic calorific value (Bf:endo) [J/g] of the expanded beads and an exothermic calorific value (Bf:exo) [J/g] as measured based on Condition 1 described below according to the heat flux differential scanning calorimetry satisfies the following Expression (2).

$$[(Bf:endo)-(Bf:exo)]>20 \quad (2)$$

Condition 1

[Measurements of Endothermic Calorific Value and Exothermic Calorific Value]

The measurements of the endothermic calorific value (Bf:endo) and the exothermic calorific value (Bf:exo) are values which are determined based on a DSC curve (hereinafter, also referred to as the first DSC curve) obtained when heating and melting 1 to 4 mg of a measurement sample of the expanded beads from 23° C. to a temperature that is 30° C. higher than that at the end of a fusion peak, at a heating rate of 10° C./min, according to the heat flux differential scanning calorimetry as described in JIS K7122 (1987). Note that, in a case where the measurement sample obtained from one expanded beads is less than 1 to 4 mg, it is necessary to adjust the measurement sample within the range of 1 to 4 mg with respect to a plurality of expanded beads. Further, in the above-described measurement, at least five samples taken from the expanded beads group are measured and averaged.

The difference [(Bf:endo)-(Bf:exo)] in Expression (2) above represents a difference between an endothermic calorific value (Bf:endo) that is energy absorbed when a crystalline portion already possessed by the expanded beads at the time of performing the heat flux differential scanning calorimetry and a crystalline portion of the expanded beads that crystallized in the heating process at the time of the measurement are melt, and an exothermic calorific value (Bf:exo) that is energy released when the expanded beads are crystallized in the heating process of the heat flux differential scanning calorimetry, and as the difference is smaller, the crystallization of the expanded beads is not progressed prior to the heat flux differential scanning calorimetry, and as the difference is larger and closer to the value of the endothermic (Bf:endo), the crystallization of the expanded beads has been progressed prior to the heat flux differential scanning calorimetry. As the expanded beads used in the production method of the present invention, expanded beads in which the difference [(Bf:endo)-(Bf:exo)] is large and the crystallization has been progressed are preferably used. Particularly, from the above viewpoint, the lower limit of the difference is preferably 23 J/g or more, more preferably 25 J/g or more, and still more preferably 27 J/g or more. In addition, the upper limit of the difference is more preferably 70 J/g, and still more preferably 60 J/g. Note that the calorific value is an endothermic calorific value derived from the polylactic acid-based resin.

The conventional polylactic acid-based resin expanded beads are expanded beads used for an in-mold molding, and in this case, crystallization by heat treatment is not performed at an expanded beads stage in order to enhance a secondary expanding. Thus, the in-mold molding is performed using expanded beads of which the crystallization is not progressed, and after the in-mold molding, the molded article is subjected to heat treatment such that the crystallization of the resin constituting the molded article is progressed, thereby obtaining a polylactic acid-based resin expanded beads molded article having excellent heat resistance or strength.

In contrast, in the production of the composite molded article of the present invention, since the expanded beads and the thermosetting resin cured product formed between the expanded beads are integrally fixed, the thermosetting resin is present at each interface of the expanded beads. In this case, it is thought that the expanded beads are susceptible to curing heat of the thermosetting resin as compared with a case where the thermosetting resin is laminated on an expanded beads molded article. Thus, in the present invention, it is necessary to product a composite molded article using the polylactic acid-based resin expanded beads which have been subjected to crystallization treatment at the expanded beads stage.

Note that the method of obtaining the polylactic acid-based resin expanded beads of which the crystallization has been progressed is not particularly limited as long as the crystallinity of the polylactic acid-based resin can be adjusted, but examples thereof include a method of obtaining expanded beads by performing heat treatment at the expanding step and progressing crystallization, and a method of heat-treating expanded beads under an atmosphere of 65° C. or higher. Note that the heat treatment temperature of the expanded beads is preferably 66 to 80° C., and more preferably 67 to 75° C. Further, the heat treatment time is preferably 8 hours or more.

(ii) The heat-generation temperature may be substantially further suppressed by adding a resin powder having a melting point lower than the heat-generation temperature, into a thermosetting resin mixture liquid constituting the uncured expanded beads aggregate. As the resin powder, a resin powder having a melting point of 100° C. to 150° C., which is selected from, for example, high-density polyethylene, polypropylene and the like, is suitable. Note that, when using the resin powder in combination, the charged amount varies depending on the product shape or the blended amount of the resin. In general, it is effective to increase the blended amount of the resin powder as the product thickness increases. The blended amount of the resin powder may be determined by confirming a trial product by a preliminary test, but in general, the blended amount is preferably about 3 to 200 parts by weight, and more preferably 10 to 100 parts by weight based on 100 parts by weight of the thermosetting resin material. Further, in a case where the resin powder increases quantitatively and causes a problem with dispersion and the like, the resin powder is subjected to a primer treatment or a treatment with a surface-treatment agent to enhance a so-called wettability of the thermosetting resin.

Note that, in the present invention, the composite molded article may be obtained by placing a plurality of polylactic acid-based resin expanded beads having the above-described crystallinity into a decompressible vessel-like mold, impregnating a void between expanded beads constituting the expanded beads molded article placed in the mold with a thermosetting resin composition containing a reinforcing fiber (thermosetting resin liquid raw material) under a reduced pressure such that the expanded beads and the thermosetting resin composition come into a mixed state, and curing the mixture. At this time, the composite molded article may be obtained by molding an expanded beads molded article having a void between expanded beads in advance, impregnating the void of the expanded beads molded article with the thermosetting resin liquid raw material, and curing it (first aspect). In this case, the porosity of the expanded beads molded article is preferably 3 to 30% by volume. From the viewpoint of having lightweight and enhancing the contribution of the strength development by the cured thermosetting resin, it is preferred to be 5 to 25% by volume.

Further, from the viewpoint of ease of blending the reinforcing fiber at a high concentration, simple and easy handling, and ease of obtaining the composite molded article by press forming, the production method through an uncured expanded beads aggregate to be described below is recommended.

That is, the production method is a production method including a step of mixing polylactic acid-based expanded beads having the above-described crystallinity and a thermosetting resin composition containing a reinforcing fiber to form an uncured expanded beads aggregate which is a mixture of the expanded beads and the thermosetting resin composition and is solid or semi-solid at ambient temperature, and a step of heating, pressing, molding, and curing the uncured expanded beads aggregate.

The uncured expanded beads aggregate refers to that having a plurality of expanded beads and a thermosetting resin composition containing a reinforcing fiber, and the thermosetting resin composition contains a curing agent but is substantially uncured, and in addition, is an aggregate that is solid or semi-solid at ambient temperature, generally, an aggregate which is called a B-stage, a prepreg, or the like (hereinafter, sometimes referred to as a "B-stage product" or "B-stage material"). Specific examples thereof include a semi-solid type having fluidity at ambient temperature, or a state which is solid at ambient temperature but has fluidity upon heating.

Such a production method of the uncured expanded beads aggregate will be described below using a case of using an unsaturated polyester resin in the thermosetting resin as an example.

The above-described reinforcing fiber, a thermosetting resin raw material, and a curing agent (polymerization initiator) of the thermosetting resin are mixed with stirring, and uniformly dispersed to prepare a thermosetting resin mixture liquid. Additionally, a thickening agent is added to the thermosetting resin mixture liquid.

The thickening agent reacts with carboxyl groups of the terminal groups of the unsaturated polyester resin to increase the molecular weight of the unsaturated polyester resin, and as a result, forms the unsaturated polyester resin in a sold or semi-solid form. In general, oxides or hydroxides of alkaline earth metals may be exemplified. Specific examples thereof include alkaline earth metal oxides such as magnesium oxide or calcium oxide, alkaline earth metal hydroxides such as magnesium hydroxide or calcium hydroxide, a polyisocyanate compound, and metal alkoxide.

Further, as the thickening agent, a resin powder having a constitution which is dissolved in the thermosetting resin mixture liquid but not entirely may be employed. As long as it melts and acts to increase the viscosity, and is not remarkably involved in polymerization reaction, the polymer structure is not particularly limited, but an amorphous vinyl polymer (polystyrene-based or polymethyl methacrylate-based) or the like is generally employed.

The thickening agent is not limited as long as the fluidity of the uncured aggregate can be secured, but from the viewpoint of the relationship between the economic efficiency and the dispersion step simplification, the amount thereof is preferably 30 parts by weight or less, and particularly preferably 20 parts by weight or less based on 100 parts by weight of the unsaturated polyester resin.

Subsequently, the heat-treated expanded beads and the thermosetting resin mixture liquid are mixed to cover (coat) the expanded beads surface with the thermosetting resin mixture liquid. Note that the mixing of the expanded beads and the thermosetting resin mixture liquid is preferably performed using a batch type mixer such as a Ploughshare mixer or a Henschel mixer, or a continuous mixer such as a mono pump or a screw pump so as not to be accompanied by cutting or destruction of the expanded beads in a mixing motion.

After the coating operation is completed, the expanded beads having the resulting thermosetting resin mixture liquid (unsaturated polyester resin mixture liquid) attached onto the surface are accommodated in a state of being integrated in a mold or the like, and left to stand with warming at about 30 to 40° C. for 1 to 4 days. Then, a thickening reaction proceeds by the action of the thickening agent, and the viscosity of the unsaturated polyester resin mixture eventually increases to 100 cps or more, so that the unsaturated polyester resin becomes solid or semi-solid at ambient temperature. As a result, a massive solid formed of the uncured expanded beads aggregate is obtained with a shape retention property, and since tack of the surface is substantially lost, it becomes easy to handle. In this state, the curing agent is substantially not yet decomposed.

Note that, in order to form the uncured expanded beads aggregate (B-stage material), a warming action is performed to temporarily increase a temperature. This warming is preferably performed within a range of the temperature that is 30° C. or more lower than the temperature at which the thermosetting resin is cured.

For the purpose of securing the strength of the composite molded article, the B-stage material preferably has a density of 80 g/L to 300 g/L. Meanwhile, low-density expanded beads hold superiority from the economical view. In the management of these, the density of the B-stage material may be managed by adjusting each component based on Expression (3) below.

$$D_{bs} = \frac{W_b + W_r}{2\left(\frac{W_b}{d_b} + \frac{W_r}{d_r}\right)} \quad (3)$$

In the expression, $W_b$ represents an amount (g) of the expanded beads added, $W_r$ represents an amount (g) of the resin mixture liquid added, $d_b$ represents a density (g/L) of the expanded beads, $d_r$ represents a density (g/L) of the resin mixture liquid, and $D_{bs}$ represents a density (g/L) of the B-stage material.

The expanded beads aggregate obtained by mixing the thermosetting resin mixture liquid and the expanded beads and warming the mixture is covered with a resin film or sheet and stored for the purpose of storage until producing (forming) a composite molded article or laminate in a subsequent step, and ensuring ease of the work in forming a composite molded article or laminate. The reason for covering with a sheet is to suppress mechanical properties and the like from being lowered by a cure failure during the production of the composite molded article or laminate due to the contact of the thermosetting resin including a polymerizable monomer and the like with air, as much as possible.

The composite molded article may be obtained by heating the uncured expanded beads aggregate. For example, a plate-like composite molded article may be obtained by hot-press-forming the obtained uncured expanded beads aggregate. Note that the heating temperature during the press forming is a temperature equal to or higher than the decomposition temperature of the curing agent contained in the thermosetting resin. Since the thermosetting resin composition constituting the uncured expanded beads aggregate is merely thickened by a thickening agent, when placed under heating at a temperature equal to or higher than the decomposition temperature of the curing agent, the viscosity is lowered due to heat at the initial stage, so that the adherence between the expanded beads are weakened, which makes movement and deformation of the expanded beads easy. Therefore, by utilizing such a phenomenon, it may be moldable not only in a plate-like shape but also in a shallow draw shape by the press-forming. Thereafter, when the press state is maintained under the heating, the viscosity increases again with the progress of the curing (crosslinking) reaction, and thus, the curing is finally completed, thereby forming a composite molded article.

The composite molded article of the present invention may be obtained by the method as described above. Since the composite molded article is formed by bonding the aliphatic polyester-based resin expanded beads through the thermosetting resin cured product containing the reinforcing fiber present between the expanded beads, and integrally fixing them, the molded article is excellent in strength and lightweight.

Further, since the composite molded article of the present invention contains the expanded beads, it has a heat insulating performance. The thermal conductivity of the composite molded article is preferably 0.06 W/(m·K) or less, and more preferably 0.05 W/(m·K) or less.

(Cured Product Layer)

A cured product layer formed of the thermosetting resin cured product (hereinafter, simply referred to as a "thermosetting resin layer" or "cured product layer") may be formed in the periphery of the composite molded article. The cured product layer is present as a coating layer that coats the periphery of the composite molded article. Note that the thickness of the thermosetting resin cured product layer in the periphery of the composite molded article is preferably 0.1 to 5 mm, and more preferably 0.3 to 3 mm.

In addition, the cured product layer may enhance the surface hardness with coatability. Further, the thermosetting resin cured product layer portion has a performance to transmit light. Therefore, it may be used as a heat insulating panel serving as an inner and outer wall in which light generated by turning on an indoor lighting at night is visible from the outside.

Such a cured product layer may be formed, for example, by disposing the uncured expanded beads aggregate in a mold, introducing the thermosetting resin liquid raw material into a gap between the mold and the aggregate, and then, curing it. In addition, the cured product layer may be formed by disposing the expanded beads molded article having a void in a mold, impregnating the void of the expanded beads molded article disposed in the mold with the thermosetting resin liquid raw material, filling the mold with the thermosetting resin liquid raw material, and then curing it. Thus, as the outside of the composite molded article is covered with the cured product layer, a composite molded article having more excellent strength may be obtained.

(Decorative Molded Article)

When forming the cured product layer as described above, a composite molded article further having an excellent decoration property may be obtained by embedding a sheet material formed of paper, woven fabric, non-woven fabric, a plastic sheet, a metal mesh, or the like, into the cured product layer. Further, since the sheet material is embedded into the cured product layer, the sheet material is firmly fixed without any problem that the sheet material itself is peeled off or damaged, so that a composite molded article with the enhanced decoration property, strength and others is formed. Note that, in order to embed the sheet material into the cured product layer, for example, a method of disposing the expanded beads molded article or the uncured expanded beads aggregate and the sheet material in the mold in advance prior to the curing of the cured product layer, and then, forming the cured product layer, may be considered.

(Heliostat Member)

Further, since the composite molded article is lightweight as well as is excellent in strength, it may also be used as a heliostat member, which is used for a solar power generation and the like. Specifically, a resin mirror having a reflective mirror surface is formed by laminating a mirror film having a metal layer on the composite molded article. In this case, it is preferred to form the cured product layer and laminate the mirror film on the cured product layer because a smoother surface may be formed.

Then, by forming a resin mirror in which, as for the surface of the resin mirror, a mean surface waviness Wa as measured by JIS B0601 (2013) is 3 µm or less, and a mean surface roughness Ra is 2 µm or less, it is more useful as the heliostat member.

Specifically, after a composite molded article is prepared, the surface of the composite molded article is subjected to surface polishing by a rotary fixed abrasive (#800). Thereafter, a polyester resin film having a thickness of 200 µm which has a pressure-sensitive adhesive layer on one side with indium deposited on the other side is attached to the polished composite molded article by a two-sided vacuum molding machine NGF0406S manufactured by Fu-se Vacuum Forming Ltd. to obtain a resin mirror. The resin mirror is a 200 mm (vertical)×200 mm (horizontal)×20 mm (thickness) molded article having a density of 273 kg/m$^3$, and has a mean surface waviness Wa of 0.64 µm, a mean surface roughness Ra of 0.18 µm, and a total reflectance of 99% or more.

(Laminate)

A surface layer material may be laminated on the above-described composite molded article of the present invention.

Examples of the surface layer material which may be used in the laminate include metal, glass, wood, stone, a resin plate, and the like. Note that as the metal, iron (including stainless steel), aluminum, titanium, magnesium, nickel, and the like may be used, and stainless steel and duralumin, which are alloys thereof, are also included.

Note that the surface layer material is not necessarily planar, and may include a molding shape such as, for example, a curved shape in a press forming. In the case of the press forming, the forming method is not particularly limited as long as the accuracy can be secured in consideration of the spring-back of the material.

The thickness of the surface layer material is preferably 20 mm or less. It is more preferably 15 mm or less from the viewpoint of the weight lightening. Note that, in the case where the surface layer material is glass, it is preferred to use glass having a thickness of 50 µm to 5 mm, and the glass includes a mirror adjusted by silver deposition.

The thickness to be set for each material is intended to be set to achieve reasonable curing when heat-molding the uncured expanded granule aggregate in the B-stage, and is not necessarily limited to the above-described thickness.

In order to secure the adhesion between the surface layer material and the composite molded article, the contact surface of the surface layer material (sometimes referred to as a "surface material") with the thermosetting resin may also be subjected to an easy adhesion processing such as polishing and primer coating. When a polyolefin-based resin plate is used as the surface layer material, a toluene solution of acid-modified polypropylene or the like may be used as a primer.

(Metal Pipe)

Note that it is possible to use a metal pipe as the surface layer material, and it is also possible to form a laminate in which a hollow portion of the metal pipe is filled with the composite molded article. The metal tube is formed of a metal material which is generally widely used, such as iron, aluminum or copper, and the kind thereof is not particularly limited as long as it can form a hollow portion having a cross-section in a tubular (pipe) shape such as a round shape and a square shape, or a channel shape, a U-shape, or an L-shape. In addition, the hollow portion may be formed in a tubular shape by combining these metal bodies. Further, including alloys thereof, a material having a characteristic depending on the intended use is selected.

Such a metal pipe may be produced by a method of filling the inside of the metal pipe with the expanded beads aggregate and solidifying it, or a method of placing the expanded beads molded article in the metal pipe and then impregnating and solidifying the thermosetting resin liquid raw material. Note that it is preferred to insert the resin expanded beads molded article into the hollow portion of the metal body in advance, and then, impregnate and cure the thermosetting resin liquid raw material between the expanded beads, from the viewpoint that the network structure formed of the thermosetting resin cured product is uniformly formed. In this way, a laminate in which the tubular composite molded article is covered with the metal pipe which is laminated thereon, is formed.

As such, in the composite molded article of the present invention, since the aliphatic polyester-based resin expanded beads are used as expanded beads constituting the composite molded article, the expanded beads, the reinforcing fiber present in the thermosetting resin, and the thermosetting resin are integrally fixed, thereby forming a composite molded article having higher strength than that in a conventional manner.

Further, the laminate formed by laminating the composite molded article of the present invention and the surface layer material also exhibits high strength.

EXAMPLES

Next, the present invention will be described in more detail with reference to the examples, but the present invention is not limited to the examples. Further, the measurement method and evaluation method of each measurement item will be described later.

Example 1

<Preparation of Polylactic Acid-Based Expanded Beads>

As expanded beads of an aliphatic polyester resin, polylactic acid-based resin beads having a multilayer structure (denoted as "PLA" in Table 1) were prepared in the following procedure.

An extrusion apparatus equipped with a co-extrusion die for multilayer strand provided at the outlet side of a core layer-forming extruder having an inner diameter of 65 mm and a coating layer-forming extruder having an inner diameter of 30 mm, was used.

The core layer-forming extruder was fed with a crystalline polylactic acid resin: "TERRAMAC TP-4000E" manufactured by Unitika Ltd. (melting point: 163° C., MFR (190° C./2.16 kgf): 4.6 g/10 min, Vicat softening temperature: 157° C.), and the coating layer-forming extruder was fed with a low-crystalline polylactic acid resin: "TERRAMAC TP-4001E" manufactured by Unitika Ltd. (melting point: none, MFR (190° C./2.16 kgf): 6.0 g/10 min, Vicat softening temperature: 58° C.), which were then melt-kneaded. The melt-kneaded materials were introduced into the co-extrusion die at a weight ratio of core layer feed amount/coating layer feed amount of 90/10, and merged within the die, and co-extruded from pores of a die attached to the extruder tip as a multilayered strand in which the coating layer was laminated on the outer peripheral surface of the core layer, and the co-extruded strand was cooled with water, cut by a pelletizer such that the weight is about 2 mg, and dried to obtain cylindrical multilayered resin beads having a sheath-core structure.

Note that as a cell adjusting agent, a polytetrafluoroethylene powder (trade name: TFW-1000, manufactured by SEISHIN ENTERPRISE Co., Ltd.) was added to the polylactic acid-based resin of the core layer in a master batch such that the content is 1,000 ppm by weight.

Subsequently, polylactic acid-based resin expanded beads were prepared using the resin beads.

First, 1 kg of the resin beads obtained as described above, together with 3 L of water as a dispersion medium, were introduced into a 5-L closed vessel equipped with a stirrer, and additionally, 0.1 parts by weight of aluminum oxide as a dispersant and 0.01 parts by weight of a surfactant (trade name: Neogen S-20F, manufactured by DKS CO.Ltd., sodium alkylbenzene sulfonate) as an active component amount were added to the dispersion medium. Subsequently, the temperature was raised to 140° C. with stirring, and carbon dioxide was injected as a blowing agent into the sealed vessel until the pressure reaches 2.8 MPa (G), and maintained at the temperature for 15 minutes. Then, the temperature was raised to the blowing temperature, and carbon dioxide was injected until the pressure reaches 3.0 MPa (G), and maintained at the blowing temperature of 145° C. for 15 minutes. Thereafter, the contents were released under the atmospheric pressure while applying a back pressure with carbon dioxide to obtain polylactic acid-based resin beads having the bulk density shown in the table. Note that the addition amounts (parts by weight) of the dispersant and the surfactant are amounts based on 100 parts by weight of the polylactic acid-based resin beads.

Note that the obtained expanded beads were subjected to heat treatment under an atmosphere of 70° C. for 8 hours.

The endothermic calorific value (Br: endo) of the polylactic acid-based resin constituting the obtained expanded beads by Condition a was 38 J/g.

Meanwhile, the difference between the endothermic calorific value (Bf:endo) [J/g] of the expanded beads and the exothermic calorific value (Bf:exo) [J/g] of the expanded beads by Condition 1 was 28 J/g. Note that the value of the difference of the expanded beads before adjusting the crystallinity was 12 J/g.

<Preparation of Uncured Expanded beads Aggregate and Composite Molded Article>

(Preparation of Uncured Expanded beads Aggregate)

In a polypropylene (PP) beaker having an internal volume of 2 L, 400 g of an unsaturated polyester resin raw material (trade name "U-PICA 4007A" manufactured by Japan U-pica Co., Ltd., denoted as "UP" in Table 1) as a thermosetting resin raw material, 120 g of a glass fiber having a fiber length L of 80 μam, a fiber diameter D of 11 μm, and L/D of 8 (trade name "Milled Fiber" manufactured by Central Glass Co., Ltd., denoted as "GF" in Table 1) as a reinforcing fiber, 12 g of benzoyl peroxide (BPO) as a polymerization initiator, and 12 g of magnesium oxide (MgO) as a thickening agent were weighted and stirred to prepare a resin mixture liquid.

Subsequently, 225 g of the polylactic acid-based expanded beads having the multilayer structure (crystallinity adjusted) was introduced into an SUS vat having an internal volume of about 20 L, and the resin mixture liquid was introduced in two divided portions thereto.

In the first introduction, since it takes time for the surface of the expanded beads to adapt to mixing, the resin mixture liquid was carefully mixed using a spatula so as to envelop the surface of the expanded beads without damaging the surface.

Then, in the second introduction, the resin mixture liquid was mixed so as to be uniformly coated on the surface of the expanded beads. The mixed uncured expanded beads aggregate was sandwiched between polyethylene films so as not to be in contact with the outside air, formed into a block shape having a thickness of about 100 mm square, and left to stand at 23° C. for 72 hours to obtain an uncured expanded beads aggregate (denoted as "B-stage product" in Table 1). After the lapse of time, and after confirming that it was modified to a clay-like block, the density was measured to be 125 g/L.

(Preparation of Composite Molded Article)

The uncured expanded beads aggregate was sandwiched into a mold formed of two iron plates, which was coated with polytetrafluoroethylene, compressed to have a thickness of 20 mm and a density of 250 g/L, and maintained by a heat press of 100° C. for 1 hour to cure the thermosetting resin. After the lapse of time, the mold was released by lowering the temperature, thereby preparing a composite molded article (20 mm in thickness×300 mm in height×50 mm in width). For the obtained composite molded article, the density, flexural modulus, and specific flexural rigidity were measured by a method to be described below. The measurement results and others are summarized in Table 1.

<Preparation of Laminate>

The uncured expanded beads aggregate (B-stage product) was sandwiched between aluminum plates each having a thickness of 3 mm as a surface layer material, and set such that the density of the thermosetting resin cured product when laminated was about 250 g/L, and heated with a heat press at 100° C. to obtain a laminate (40 mm×300 mm×50 mm). Note that an iron plate optionally coated with polytetrafluoroethylene was used as the heat press in consideration of the releasability later. For the obtained laminate, the thickness, density, and 1 mm deflection load were measured by a method to be described below. The measurement results and others are summarized in Table 1.

Example 2

The resin beads were expanded by injecting carbon dioxide to 3.8 MPa (G) under the production condition of the expanded beads such that the bulk density of the polylactic acid expanded beads became 42 g/L. Further, an uncured expanded granule aggregate (B-stage product) was obtained in the same manner as in Example 1 except that the conditions shown in Table 1 were used.

A composite molded article was obtained from the B-stage product in the same manner as in Example 1.

Using this B-stage product, 0.9-mm glass sheets (plates) were laminated as a surface layer material on the upper and lower surfaces of the B-stage product to obtain a laminate having a thickness of 20 mm and a density of 0.41 kg/L. The results are shown in Table 1.

Example 3

A resin mixture liquid composed of 380 g of an epoxy resin (trade name: jER 828) manufactured by Mitsubishi Chemical Corporation, as an epoxy resin (denoted as "EP" in Table 1), for the thermosetting resin, and 20 g of boron trifluoride monoethylamine (TFBMEA) was used and 240 g of a carbon fiber (fiber length L 200 μm, mean diameter D of the fiber cross-section 20 μm, L/D=10, denoted as "CF" in Table 1) as a reinforcing fiber was used to thereby prepare a thermosetting resin mixture liquid, and a composite molded article was prepared under the condition shown in the table in the same manner as in Example 1.

Using the B-stage product of Example 3, iron plates having a thickness of 0.5 mm were laminated as a surface layer material on the upper and lower surfaces of the B-stage product to obtain a laminate having a thickness of 20 mm and a density of 0.89 kg/L. The results are shown in Table 1.

Example 4

A composite molded article and a laminate were obtained in the same manner as in Example 1 except that the expanded beads used in Example 2 were used and the condition shown in the table was applied.

Example 5

An uncured expanded granule aggregate (B-stage product) was obtained in the same manner as in Example 1 except that 112.5 g of the expanded beads having a bulk density of 42 g/L used in Example 2, 800 g of the thermosetting resin, and 24 g of the polymerization initiator (BPO) were used in order to have the same volume ratio of the expanded beads and the thermosetting resin cured product as that in Example 1 in which the expanded beads having a bulk density of 84 g/L were used.

A composite molded article was obtained from this B-stage product in the same manner as in Example 1. The result of the physical properties of the composite molded article was shown in Table 1. It was confirmed that the flexural modulus and the specific flexural rigidity were equal to those in Example 1.

Example 6

In the preparation of the composite molded article in Example 5, the thermosetting resin was maintained by a heat press of 100° C. for 45 minutes and cured to obtain a composite molded article having a density of 233 g/L. The measurement results for the physical properties of the composite molded article are shown in Table 1.

Example 7

An uncured expanded granule aggregate (B-stage product) was obtained in the same manner as in Example 1 except that 140 g of the thermosetting resin of Example 1, 6 g of BPO, and 6 g of a thickening agent were used in order to change the volume ratio of the expanded beads and the thermosetting resin cured product in the composite molded article.

A composite molded article was obtained from the B-stage product in the same manner as in Example 1. The measurement result for the physical properties of the composite molded article is shown in Table 1.

Note that, in the Examples, similarly to Example 1, the composite molded article was prepared using polylactic acid-based resin expanded beads with crystallinity adjusted.

TABLE 1

| | | | Unit | Example 1 | Example 2 | Example 3 | Example 4 | Example 5 | Example 6 | Example 7 |
|---|---|---|---|---|---|---|---|---|---|---|
| Resin mixture composition | Expanded beads | Resin | | PLA (crystalline) | PLA (crystalline) | PLA (crystalline) | PLA (crystalline) | PLA (crystalline) | PLA (crystalline) | PLA (crystalline) |
| | | Bulk density | g/L | 84 | 42 | 84 | 42 | 42 | 42 | 84 |
| | | Weight | g | 225 | 180 | 275 | 155 | 112.5 | 112.5 | 225 |
| | Thermosetting resin | Resin | | UP | UP | EP | UP | UP | UP | UP |
| | | Weight | g | 400 | 800 | 380 | 800 | 800 | 800 | 140 |
| | Reinforcing fiber | Kind | | GF | GF | CF | GF | GF | GF | GF |
| | | Weight | g | 120 | 240 | 240 | 120 | 120 | 120 | 120 |
| | | Length | μm | 80 | 80 | 200 | 80 | 80 | 80 | 80 |
| | | L/D | | 7 | 7 | 10 | 7 | 7 | 7 | 7 |
| | Polymerization initiator | Kind | | BPO | BPO | TFBMEA | BPO | BPO | BPO | BPO |
| | | Weight | g | 12 | 24 | 20 | 12 | 24 | 24 | 6 |

TABLE 1-continued

|  |  | Unit | Example 1 | Example 2 | Example 3 | Example 4 | Example 5 | Example 6 | Example 7 |
|---|---|---|---|---|---|---|---|---|---|
|  | Thickening agent Kind | | MgO | MgO | — | MgO | MgO | MgO | MgO |
|  | Weight | g | 12 | 24 | 0 | 12 | 12 | 12 | 6 |
|  | Density of resin mixture liquid | *1 g/L | 1370 | 1370 | 1050 | 1150 | 1150 | 1150 | 1500 |
| Intermediate | B-stage condition | Temperature °C. | 23 | 23 | 23 | 23 | 23 | 23 | 23 |
|  | | Time hour | 72 | 72 | 24 | 72 | 72 | 72 | 72 |
|  | B-stage product density | g/L | 125 | 125 | 125 | 125 | 125 | 125 | 125 |
| Composite molded | Density | g/L | 250 | 250 | 250 | 250 | 250 | 233 | 250 |
| article | Flexural modulus | MPa | 300 | 280 | 2100 | 280 | 300 | 220 | 260 |
|  | Specific flexural rigidity | *2 | 0.027 | 0.026 | 0.051 | 0.026 | 0.027 | 0.026 | 0.025 |
|  | State of interface between beads and thermosetting resin after curing: appearance etc. (related to heat resistance) | | A | A | A | A | A | A | A |
| Laminate | Surface layer material (surface material) | Kind | Aluminum | Glass | Iron | Aluminum | — | — | — |
|  | | Thickness mm | 3 | 0.9 | 0.5 | 0.5 | — | — | — |
|  | Lightweight laminate | Thickness mm | 40 | 20 | 20 | 20 | — | — | — |
|  | | Density Kg/L | 0.55 | 0.41 | 0.89 | 0.35 | — | — | — |
|  | 1 mm deflection load | kN | 1.6 | 0.5 | 1.1 | 0.4 | — | — | — |

*1: The density of the resin mixture liquid is a density of the resin mixture liquid except for the expanded beads
*2: Unit of specific flexural rigidity; [MPa$^{1/3}$/(kg/m$^3$)]

Comparative Example 1

As expanded beads, a crosslinked product (modified polypropylene-based resin beads) of mixed resin beads composed of 60% by weight of a propylene-ethylene random copolymer in which the content of the ethylene component was 4.0% by weight, 30% by weight of impact-resistant polystyrene, and 10% by weight of 1,2-polybutadiene was expanded to prepare expanded beads having a density of 84 g/L.

A composite molded article was obtained through an uncured expanded granule aggregate (B-stage product) in the same manner as in Example 1 except that these expanded beads were used.

In addition, the uncured expanded granule aggregate (B-stage product) was cut to be 400 mm in length and 300 mm in width (22 mm in thickness as it is).

Subsequently, as a surface layer material, a commercially available sheet molding compound (SMC) (trade name "Selecty Mat R-101" manufactured by Takeda Pharmaceutical Co. Ltd.) was cut into two sheet molding compounds of 400 mm in length and 300 mm in width, and the two sheet molding compounds were placed in a female mold, which was heated at 110° C., in a state of being superimposed on the upper and lower surfaces of the uncured aggregate (B-stage product), and pressed (press pressure: 4 MPa (G)) by a male mold formed of the same material, which was heated at 110° C. and provided with a press mechanism having a mechanism that matches the female mold, to obtain a laminate having a cured product of SMC as a surface layer material on each of the upper and lower surfaces. The results are shown in Table 2.

Comparative Example 2

A composite molded article was prepared in the same manner as in Comparative Example 1 except that an aluminum plate was used as the surface layer material. The results are shown in Table 2.

Comparative Example 3

An uncured expanded granule aggregate (B-stage product) was obtained in the same manner as in Example 1 except that the reinforcing fiber of Example 1 was not blended.

A composite molded article was obtained from the B-stage product in the same manner as in Example 1. The measurement result for the physical properties of the composite molded article is shown in Table 2. It has been confirmed that the flexural modulus was reduced by 74% and the specific flexural rigidity was reduced by 37% as compared with Example 1.

Comparative Example 4

A composite molded article of Comparative Example 4 was obtained in the same manner as in Comparative Example 1 except that no reinforcing fiber was added. The measurement result for the physical properties of the composite molded article is shown in Table 2.

Note that, in a case where the expanded beads are formed of a PP/PS resin, the effect of enhancing the specific flexural rigidity of the composite molded article due to a reinforcing fiber blended is small. On the other hand, in a case where the expanded beads are PLA, it is understood that the effect of enhancing the specific flexural rigidity of the composite molded article due to the reinforcing fiber is specifically increased.

Comparative Example 5

About 2 mg of resin beads substantially formed of a single component were obtained in the same manner as in Example 1 except that an amorphous polylactic acid resin (grade name: Ingeo 2003D) manufactured by NatureWorks LLC was used as the polylactic acid-based particles constituting the core layer and the coating layer of the expanded beads in Example 1, and these were expanded under the same condition as in Example 1 to obtain expanded beads. In addition, an uncured expanded beads aggregate and a composition molded article were prepared in the same manner as in Example 1. The measurement results are shown in Table 2. In the obtained composite molded article, the density was increased, the flexural modulus was low, and the specific flexural rigidity was reduced by 30%, as compared with Example 1. Further, in the cross-section of the molded article in the thickness direction, the expanded beads underwent heat shrinkage so that a gap was generated at the interface with the thermosetting resin, and a sink mark was present in the molded article.

Comparative Example 6

About 2 mg of resin beads substantially formed of a single component were obtained in the same manner as in Example 1 except that an aliphatic polyester resin "Bionolle #1001", which is composed of 1,4-buthanediol and succinic acid as the main components, (manufactured by Showa Denko K.K., melting point 113° C., MFR 1.1 g/10 min) (denoted as "PBS" in Table 2) was used in place of the polylactic acid-based resin constituting the core layer and the coating layer of the expanded beads in Example 1. Similarly to Example 1, these were placed into a sealed vessel, and in addition, 15 g of Nyper BW (water-diluted benzoyl peroxide, 75%-purity benzoyl peroxide product: manufactured by NOF Corporation) was added thereto, carbon dioxide as a blowing agent was injected into the sealed vessel until the pressure reaches 2.8 MPa (G) and maintained at 105° C. for 45 minutes, and after the temperature were decreased to 95° C., the contents were released under the atmospheric pressure to obtain expanded beads.

In addition, an uncured expanded beads aggregate and a composite molded article were prepared in the same manner as in Example 1. The measurement results are shown in Table 2. In the obtained composite molded article, the density was increased, the flexural modulus was low, and the specific flexural rigidity was reduced by 30%, as compared with Example 1. Further, in the molded article, the thermosetting resin in the cross-section in the thickness direction formed uniform meshes, and the expanded beads were present in the meshes, but some of them underwent heat shrinkage so that a gap was slightly generated at the interface with the thermosetting resin, and a sink mark was slightly present in the molded article.

Reference Example 1

In order to compare 1 mm deflection load of the laminate of the present invention with that of an iron plate, the measurement was made using a single iron plate having a thickness of 6 mm and a basis weight of 44 kg/m$^2$. The 1 mm deflection load was 0.78 kN, which was lower than the load in Example 3 in which a 0.5-mm iron plate was used as a surface layer material on both surfaces. The results are shown in Table 2.

TABLE 2

| | | | Unit | Comparative Example 1 | Comparative Example 2 | Comparative Example 3 | Comparative Example 4 | Comparative Example 5 | Comparative Example 6 | Reference Example 1 |
|---|---|---|---|---|---|---|---|---|---|---|
| Resin mixture composition | Expanded beads | Resin | | PP/PS | PP/PS | PLA (crystalline) | PP/PS | PLA (amorphous) | PBS (Bionolle) | — |
| | | Bulk density | g/L | 84 | 84 | 84 | 84 | 84 | 84 | — |
| | | Weight | g | 225 | 225 | 225 | 225 | 225 | 225 | — |
| | Thermosetting resin | Resin | | UP | UP | UP | UP | UP | UP | — |
| | | Weight | g | 400 | 400 | 400 | 400 | 400 | 400 | — |
| | Reinforcing fiber | Kind | | GF | GF | — | — | GF | GF | — |
| | | Weight | g | 120 | 120 | — | — | 120 | 120 | — |
| | | Length | μm | 80 | 80 | — | — | 80 | 80 | — |
| | | L/D | | 7 | 7 | — | — | 7 | 7 | — |
| | Polymerization initiator | Kind | | BPO | BPO | BPO | BPO | BPO | BPO | — |
| | | Weight | g | 12 | 12 | 12 | 12 | 12 | 12 | — |
| | Thickening agent | Kind | | MgO | MgO | MgO | MgO | MgO | MgO | — |
| | | Weight | g | 12 | 12 | 12 | 12 | 12 | 12 | — |
| | Density of resin mixture liquid | *1 | g/L | 1370 | 1370 | 980 | 980 | 1370 | 1370 | — |
| Intermediate | B-stage condition | Temperature | ° C. | 23 | 23 | 23 | 23 | 23 | 23 | — |
| | | Time | hour | 72 | 72 | 72 | 72 | 72 | 72 | — |
| | B-stage product density | | g/L | 125 | 125 | 125 | 125 | 125 | 125 | — |
| Composite molded article | Density | | g/L | 250 | 250 | 250 | 250 | 280 | 260 | — |
| | Flexural modulus | | MPa | 107 | 107 | 80 | 70 | 110 | 110 | — |
| | Specific flexural rigidity | | *2 | 0.019 | 0.019 | 0.017 | 0.016 | 0.019 | 0.019 | — |
| | State of interface between beads and thermosetting resin after curing: appearance etc. (related to heat resistance) | | | A | A | A | A | C | B | — |
| Laminate | Surface layer material (surface material) | Kind | | SMC | Aluminum | — | — | — | — | Iron 6 mm Single plate 44 Kg/m$^2$ |
| | | Thickness | mm | 2 | 3 | — | — | — | — | |
| | Lightweight laminate | Thickness | mm | 20 | 40 | — | — | — | — | |
| | | Density | Kg/L | 0.55 | 0.55 | — | — | — | — | 7.874 |
| | 1 mm deflection load | | kN | 0.5 | 1.2 | — | — | — | — | 0.78 |

*1: The density of the resin mixture liquid is a density of the resin mixture liquid except for the expanded beads
*2: Unit of specific flexural rigidity; [MPa$^{1/3}$/(kg/m$^3$)]

Hereinafter, the measurement methods according to the present invention will be described.

(Bulk Density of Expanded Beads)

The bulk density of the expanded beads was calculated as a bulk density (unit: g/L) by extracting the expanded beads at random, placing them under the atmospheric pressure at a temperature of 23° C. and a relative humidity of 50%, accommodating a number of expanded beads up to the scale of 1 L in a 1-L graduated cylinder so as to be naturally deposited while removing static electricity, and then, measuring the weight (g) of the accommodated expanded beads.

(Measurement of Density of Composite Molded Article)

The density of the composite molded article (unit: g/L) was determined by dividing the weight (g) of the composite molded article by the volume (L) of the composite molded article determined by the submersion method.

(Measurement of Flexural Modulus of Composite Molded Article)

(1) Measurement of Flexural Modulus of Composite Molded Article

In the present invention, the flexural modulus of the composite molded article was measured on the basis of JIS K7203 (1982), using the composite molded article cut into test pieces of 300 mm in length (L)×50 mm in width (W)×20 mm in thickness (t). The measurement was performed under conditions including R of a fulcrum tip: 5 mm, R of an indenter tip: 5 mm, a distance between fulcrums: 50 mm, and a bending speed: 10 mm/min. Note that, for the test pieces, five test pieces were measured to determine an average value as a flexural modulus.

(Specific Flexural Rigidity)

The specific flexural rigidity in the present invention is a value determined by Expression (1) above from the value of the flexural modulus (MPa), which was determined by the above-described method, and a converted density (kg/m$^3$) of the composite molded article.

(State of Interface between Expanded beads (Beads) and Thermosetting Resin after Curing)

The cross-section in the thickness direction of the molded article after the curing was visually observed, and evaluated by the criteria described below.

A: The thermosetting resin in the cross-section in the thickness direction of the molded article forms uniform meshes, and the expanded beads are present in the meshes without any gap.

B: The thermosetting resin in the cross-section in the thickness direction of the molded article forms uniform meshes, and the expanded beads are present in the meshes, but some of them undergo heat shrinkage so that a gap is generated at the interface with the thermosetting resin, and a sink mark is slightly present in the molded article.

C: The thermosetting resin in the cross-section in the thickness direction of the molded article cannot form uniform meshes, or those in which the expanded beads undergo heat shrinkage so that a gap is generated at the interface with the thermosetting resin occupy 10% or more, and a sink mark is present in the molded article.

(Density of Laminate)

The density (unit: kg/L) of the laminate was determined as a value obtained by dividing the weight (kg) of the laminate by the volume (L) of the laminate obtained by the submersion method.

(1 mm Deflection Load)

A three-point bending test was performed by cutting the obtained laminate at both ends by a band saw to adjust a test piece in the size of 180 mm×50 mm×product thickness, and then, measuring the weight and size. In the bending test conditions, the span between lower jigs was L=100 mm, the R of the lower jig was R=2 mm, the upper jig was R=5 mm, and the upper jig was disposed in the center position (L/2) of the lower jig. When the test piece was bent by the upper jig at a downward movement speed of 5 mm/min, the moving distance and the acting force generated at that time were measured in real time.

According to the present invention, it is possible to provide a high-strength composite molded article.

Further, the laminate obtained by laminating the composite molded article of the present invention and a surface layer material may also express high rigidity while being lightweight. In addition, the composite molded article or the laminate may be utilized in applications where a weight lightening property, rigidity, a thermal insulation property, a sound insulation property, and the like are required, such as a mirror for heliostat, a roof material for automobiles, a floor board of the ship, a filling matter of the floor for railway vehicles, a top plate of furniture desk, a back-up material for a mold by expressing its structural and physical properties.

Furthermore, the production method of the present invention may be utilized as a production method of a high-strength composite molded article.

The invention claimed is:

1. A composite molded article in which aliphatic polyester-based resin expanded beads, which have been subjected to crystallization progressing treatment at an expanded beads stage, and a thermosetting resin cured product containing a reinforcing fiber, which is formed between the expanded beads, are integrally fixed,
wherein the aliphatic polyester-based resin is a crystalline polylactic acid-based resin,
wherein the thermosetting resin is one or more selected from the group consisting of an unsaturated polyester-based resin and an epoxy-based resin,
wherein the reinforcing fiber is one or more selected from the group consisting of a glass fiber, a carbon fiber, and a vinylon fiber, and a fiber length L of the reinforcing fiber is 0.05 mm to 20 mm, and a value of L/D, which is a ratio of the fiber length L and an average diameter D of a fiber cross-section, is 2 or more,
wherein a content of the reinforcing fiber in the thermosetting resin cured product is 3% by weight to 50% by weight,
wherein the reinforcing fiber is dispersed in the thermosetting resin, and
a flexural modulus E (MPa) of the composite molded article and a density ρ (kg/m$^3$) of the composite molded article satisfy the following Expression (1):

$$E^{1/3}/\rho \geq 0.020 \; [(\text{MPa})^{1/3}(\text{kg/m}^3)^{-1}] \qquad (1).$$

2. The composite molded article according to claim 1, wherein the density of the composite molded article is 120 g/L to 700 g/L.

3. The composite molded article according to claim 1, wherein the polylactic acid-based resin has a melting point of 150° C. or higher.

4. A laminate in which the composite molded article according to claim 1 and a surface material are laminated.

5. The laminate according to claim 4, wherein the surface material is one or more selected from the group consisting of glass, metal, wood, and stone.

6. The laminate according to claim 4, wherein a density of the laminate is less than 1 kg/L.

7. The composite molded article according to claim 1, wherein an endothermic calorific value (Br: endo) of a polylactic acid-based resin is 25 J/g or more as measured based on a DSC curve obtained when heating and melting 1 to 4 mg of a measurement sample taken from polylactic acid-based resin expanded beads to a temperature that is 30° C. higher than a temperature at the end of a fusion peak, maintaining the sample at that temperature for 10 minutes, cooling the sample to 110° C. at a cooling rate of 10° C./min, maintaining the sample at that temperature for 120 minutes, subjecting the sample to a heat treatment of cooling to 40° C. at a cooling rate of 10° C./min, and then, heating and melting the sample again to a temperature that is 30° C. higher than a temperature at the end of a fusion peak at a heating rate of 10° C./min, according to the heat flux differential scanning calorimetry as described in JIS K7122 (1987).

8. The composite molded article according to claim 7, wherein an endothermic calorific value of a polylactic acid-based resin is 30-70 J/g or more.

9. The composite molded article according to claim 1, wherein a cell diameter corresponding to a mesh of the network structure constituted by the thermosetting resin cured product is 1 to 5 mm.

10. The composite molded article according to claim 9, wherein the cell diameter corresponding to a mesh of the network structure constituted by the thermosetting resin cured product is 2 to 4 mm.

11. The composite molded article according to claim 1, wherein the thermosetting resin is a combination of one or two of an unsaturated polyester-based resin and an epoxy-based resin.

12. The composite molded article according to claim 1, wherein the value of L/D is 5 to 20.

13. The composite molded article according to claim 1, wherein the content of the reinforcing fiber in the thermosetting resin cured product is 5% by weight to 40% by weight.

14. The composite molded article according to claim 1, wherein the thermosetting resin cured product is formed in a continuous phase in which a thermosetting resin composition is cured in a continuous phase state between the expanded beads.

15. A method for producing the composite molded article of claim 1 comprising:
mixing aliphatic polyester-based resin expanded beads that have been subjected to crystallization progressing treatment at an expanded beads stage and a thermosetting resin composition containing a reinforcing fiber to obtain a mixture; and
heating and curing the mixture to integrally fix expanded beads and a thermosetting resin cured product,
wherein the aliphatic polyester-based resin is a crystalline polylactic acid-based resin,
wherein the thermosetting resin is one or more selected from the group consisting of an unsaturated polyester-based resin and an epoxy-based resin, and
a difference between an endothermic calorific value (Bf: endo) [J/g] of the expanded beads and an exothermic calorific value (Bf: exo) [J/g] of the expanded beads as measured based on Condition 1 described below satisfies the following Expression (2):

$$(Bf{:}endo)-(Bf{:}exo)>20 \tag{2}$$

Condition 1: the endothermic calorific value (Bf: endo) and the exothermic calorific value (Bf: exo) are values which are determined based on a DSC curve obtained when heating and melting 1 to 4 mg of expanded beads from 23° C. to a temperature that is 30° C. higher than that at the end of a fusion peak, at a heating rate of 10° C./min according to heat flux differential scanning calorimetry as described in JIS K7122 (1987).

16. The method for producing a composite molded article according to claim 15, wherein the expanded beads used for obtaining the mixture are expanded beads having a bulk density of 15 to 250 g/L.

17. The method for producing the composite molded article according to claim 15, wherein the mixture is an uncured expanded beads aggregate which is solid or semi-solid at ambient temperature, the uncured expanded beads aggregate is placed and shaped in a mold, and the uncured expanded beads aggregate is heated and cured in the mold.

\* \* \* \* \*